United States Patent [19]
Matsuura et al.

[11] Patent Number: 5,315,511
[45] Date of Patent: May 24, 1994

[54] METHOD OF DETERMINING THE ACCEPTABILITY OF A REQUEST TO PREENGAGE RECEIPT AND/OR PAYMENT OF MONEY IN AN ATM SYSTEM USING THE SAME

[75] Inventors: Kunihisa Matsuura, Aichi; Yoshio Horiba, Owariasahi, both of Japan

[73] Assignee: Hitachi, Ltd., Tokyo, Japan

[21] Appl. No.: 510,841

[22] Filed: Apr. 18, 1990

[30] Foreign Application Priority Data

Apr. 21, 1989 [JP] Japan .................................. 1-102782

[51] Int. Cl.⁵ .............................................. G06F 15/30
[52] U.S. Cl. ...................................... 364/408; 235/379
[58] Field of Search .......................... 235/379; 364/408

[56] References Cited

U.S. PATENT DOCUMENTS 5,012,076 4/1991 Yoshida ................................ 235/379
5,140,517 8/1992 Nagata et al. ....................... 235/379

Primary Examiner—Gail O. Hayes
Attorney, Agent, or Firm—Antonelli, Terry, Stout & Kraus

[57] ABSTRACT

A method and system of preengaging a receipt and payment of money is provided which carries out the following steps: inputting dealing data as preengagement data, to carry out a dealing requested by a user; determining the acceptability of the input preengagement data with reference to use data such as the funds in, or the use status of, a cash processing apparatus installed in a branch to be transacted to which the preengagement data is input; transmitting the preengagement data to the branch to be transacted to input the preengagement data thereto, as a processing execution command when the preengagement data is determined to be acceptable; determining acceptability of substitutional preengagement data, different from the preengagement data, when the preengagement data is not accepted; and announcing the substitutional preengagement data to the user when the substitutional preengagement data is obtained.

22 Claims, 8 Drawing Sheets

METHOD OF DETERMINING THE ACCEPTABILITY OF A REQUEST TO PREENGAGE RECEIPT AND/OR PAYMENT OF MONEY IN AN ATM SYSTEM USING THE SAME

BACKGROUND OF THE INVENTION

1. Field of the Invention

The present invention relates to a method and apparatus of preengaging a receipt and payment of money in monetary facilities such as a bank.

2. Description of the Related Art

To carry out a receipt and payment of money in monetary facilities, automatic cash dealing apparatuses (or cash dispensers) are now frequently employed.

Each of such automatic cash dealing apparatuses typically includes the following components constructed by an integrated structure; a media receiving and discharging portion consisting of a card insertion hole, a passbook insertion hole and a cash receipt and payment hole; an operation portion consisting of a display unit indicating operating procedures and an inputting unit for selecting a grade of a transaction and for inputting a secret identification number or an amount of money for receipt and payment; a reading and recording portion for reading an identification card and recording data on a passbook; a cash receipt and payment mechanism receiving cash from or paying cash to a cash container in response to the transactions of the money receipt and payment; and a control portion controlling the operation of the portions set forth above. The automatic cash dealing apparatus communicates with a central computer installed in a central location through a communication channel in response to the grade of the dealing requested through the operation portion by a customer, and carries out the processing for a receipt and payment of money with reference to the balance data recorded on the account ledger.

When a customer, i.e., a user, uses the typical automatic cash dealing apparatus, the user is subjected to troublesome operations such as insertion of an identification card, selection of a grade of the transaction setting of the user's secret identification number, and setting of an amount of receipt or payment of money. Accordingly, a considerable amount of operation time is required between a time when the user start the operation and a time when the user complete the operation for a deposit or a receipt of money. Because of the number of steps which the user must take, it is very difficult to shorten the overall operation time of the automatic cash dealing apparatus required for each transaction. As a result, a long waiting line by users may be formed in front of the automatic cash dealing apparatus when many users use the automatic cash dealing apparatus during rush hour periods such as lunch time or immediately after work has finished. Under these circumstances the transactions by the automatic cash dealing apparatus may be discontinued due to a lack of money stored in the automatic cash dealing apparatus. Furthermore, users who are not familiar with handling the automatic cash dealing apparatus, such as the aged, may misoperate the apparatus because of mental pressure due to the long waiting line, and this misoperation may further result in increasing the long waiting line.

To overcome the these disadvantages, a system for preengaging a receipt and payment of money which improves the serviceability for the user is disclosed in JP-A-57-178558.

The system for preengaging a receipt and/or payment of money disclosed in JP-A-57-178558 previously receives preengagement data such as a deposit account number, a secret identification number and an amount of money to be payed in accordance with a preengagement for a payment by a telephone call by a user. The system then determines whether or not the payment is valid, and registers the preengagement data when the preengagement data is valid. Thereafter, the user who requested the preengagement goes to a place where the automatic cash dealing apparatus is located, and inserts an identification card into the automatic cash dealing apparatus in which the preengagement data is registered to receive the requested money.

In accordance with the above mentioned system for preengaging a receipt and/or payment of money, the user can preengage the transactions for the receipt of money through the telephone at a suitable time and in a any place without going to a place where the automatic cash dealing apparatus is located and without an input operating of the data to the automatic cash dealing apparatus, and can receive the preengaged money by inserting the identification card into the automatic cash dealing apparatus at a any time after the registration of the preengagement.

In the system for preengaging a receipt and/or payment of money, the preengagement data input by the user through the telephone is sent to a central processing apparatus to determine whether or not the payment is valid. In determining the validity of the preengagement request, only a check of the validity of the secret identification number and the sufficiency of an amount of money on deposit against the requested payment are carried out. If the preengagement request for payment is deemed to be invalid by the determination, for example, due to a mismatch of the input secret identification number or a lack of sufficient funds on deposit against the payment, such input operations can be repeated several times to correct the preengagement. However, when the user fails to obtain acceptance of the request during the telephone preengagement, the telephone communication line is automatically disconnected, and accordingly, the telephone preengagement can not be accepted.

SUMMARY OF THE INVENTION

An object of the present invention is to enable changing of the preengagement data by a customer when a preengagement is not accepted.

Another object of the present invention is to prevent an occurrence of the discontinuation of transactions due to, for example, a lack of money stored in an automatic dealing apparatus against the requested payment, and to thereby improve an efficiency of use of funds.

For example, if many preengagements occur in a short time, and all preengagements are accepted, when a user whose dealing request is previously registered goes to monetary facilities wherein an automatic cash dealing apparatus is located to receive money, the possibility exists that the user can not receive money due to a lack of money stored in the cash automatic dealing apparatus. Consequently, dealing through the automatic cash dealing apparatus is stopped. The present invention overcomes this disadvantage.

The above mentioned objects can be achieved in the following manner: inputting ahead of time transaction data such as a grade of the transaction, an amount of money involved, a branch to be transacted or a dealing time, as preengagement data, to carry out the transactions requested by a user; determining the acceptability of the input preengagement data with reference to use data such as the funds in, or a use status of, a cash processing apparatus installed at the branch to be transacted to which the preengagement data is input; transmitting the preengagement data to the branch to be transacted to input the preengagement data, as a processing execution command when the preengagement data is accepted by the determination; determining the acceptability of a substitutional preengagement condition different from the input preengagement data when the preengagement data is not accepted; and announcing the substitutional preengagement data to the user when the substitutional preengagement is obtained.

BRIEF DESCRIPTION OF THE DRAWINGS

Other objects and features of the present invention will be described below in more detail with reference to the accompanying drawings, in which.

DESCRIPTION OF THE PREFERRED EMBODIMENTS

Preferred embodiments of the present invention will be described more in detail with reference to the accompanying drawings.

Figure 1:
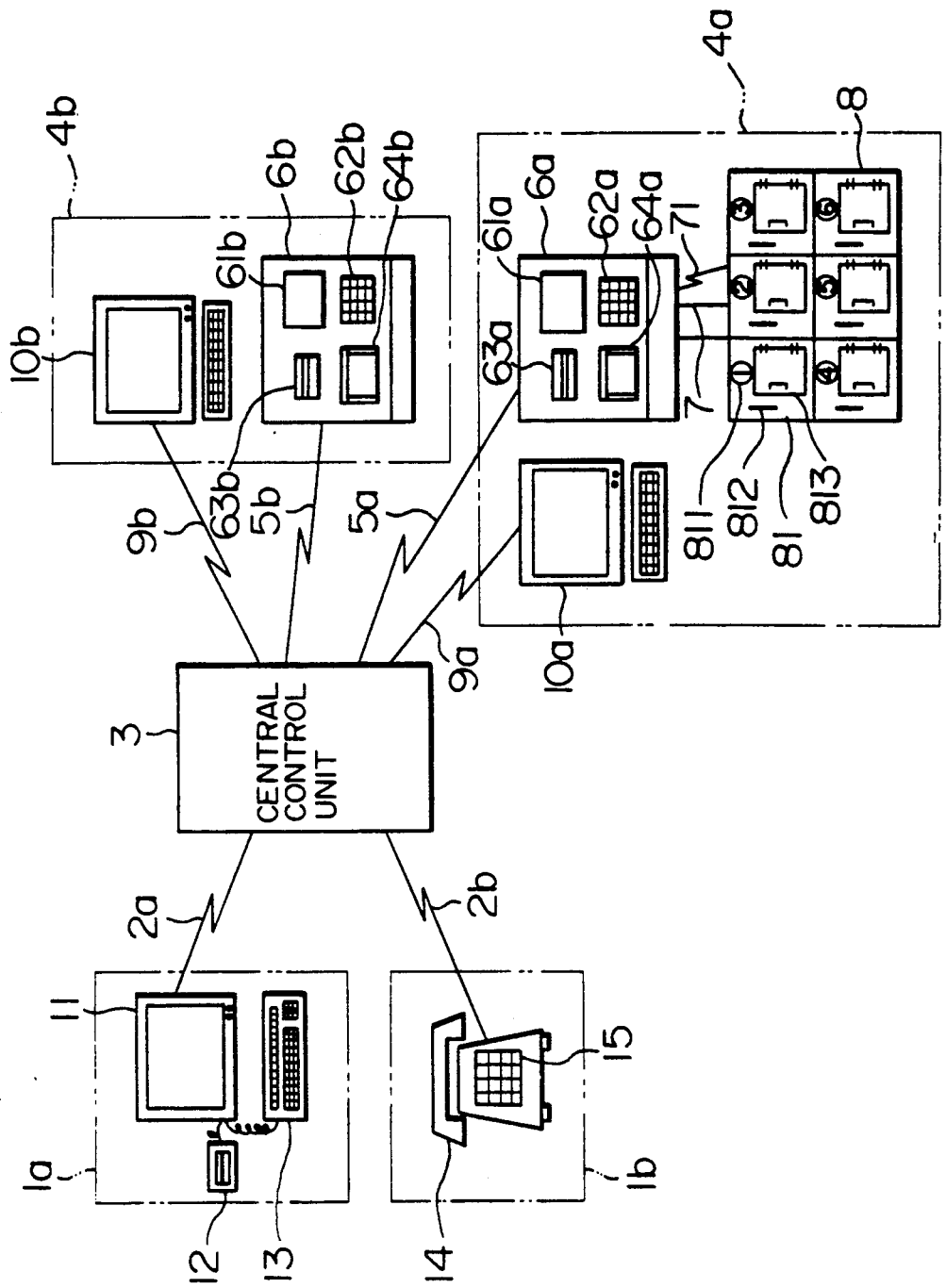
FIG. 1 is a view illustrating a construction of a first embodiment of a system for preengaging a receipt and payment of money in accordance with the present invention.

FIG. 1 is a view showing a construction of a first embodiment of a system for preengaging a receipt and payment of money in accordance with the present invention. In the drawing, reference numeral 1a denotes a preengagement input terminal comprised of a display unit 11 displaying an operational procedure and input data, a card reader 12 reading an identification card having customer identification data such as an account number of the customer, and a keyboard 13. Reference numeral 1b denotes a telephone comprised of a receiver 14 receiving an operational procedure sound signal and a pushbottom portion 15 inputting a secret identification number of the user, a dealing grade or an amount of money to be transacted. The preengagement input terminal 1a and the telephone 1b form a preengagement inputting means 1.

The preengagement input terminal 1a and the telephone 1b are connected to a central control unit 3 located in monetary facilities through communication lines 2a and 2b, respectively. At teller's windows 4a and 4b in branches of monetary facilities, cash processing apparatuses 6a and are connected to the central control unit 3 through communication lines 2a and 2b for handling a money receipt and payment in response to transactions requested by customers. Inquiry terminals 10a and 10b are connected to the central control unit 3 through communication lines 9a, 9b for inquiring as to the operating condition of the cash processing apparatuses 6a and 6b and announcing the results to managers in the teller's windows 4a and 4b.

A payment-money storage 8, described later, is connected to the cash processing apparatus 6a through a cash conveying portion 7a and a communication line 71. The payment-money storage 8 comprises a plurality of the money storages 81, each temporarily storing money for each dealing, the money being sent from the cash processing apparatus 6a in response to the payment preengagement by the customer. The construction of each portion of the system described above will be described more in detail.

Figure 2:
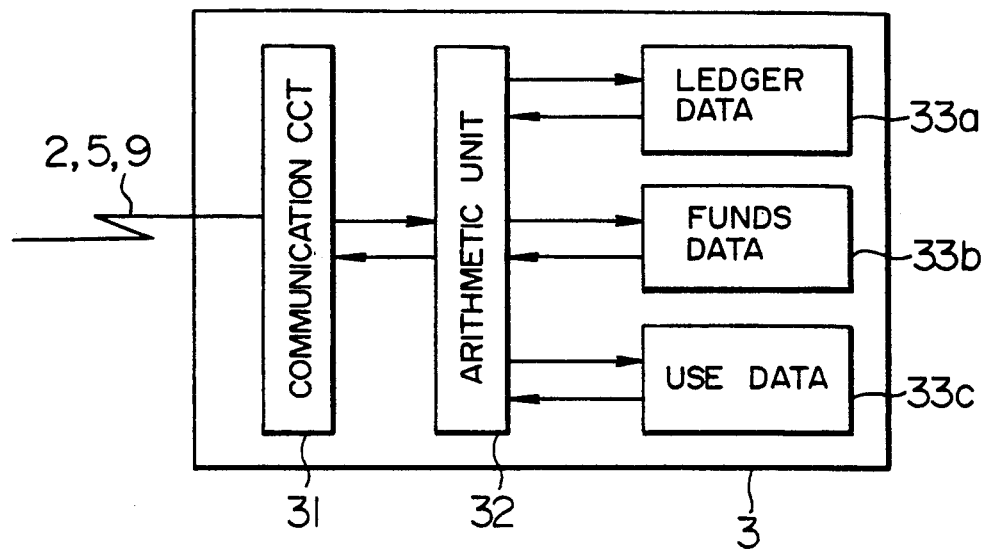
FIG. 2 is a block diagram of a central control unit shown in FIG. 1.

As shown in FIG. 2, the central control unit 3 comprises a communication circuit 31 controlling a data exchange among a preengagement inputting means 1 consisting of the preengagement input terminal 1a and the telephone 1b, and the cash processing apparatuses 6a and 6b, an arithmetic unit 32 carrying out the arithmetic operations such as a determination of acceptability of the preengagement or arranging of data as described later, and memory units 33a, 33b and 33c, storing the ledger data, data on the funds in the cash processing apparatus 6 (6a or 6b) in each branch, and data of the use of the cash processing apparatus 6, respectively.

Figure 3:
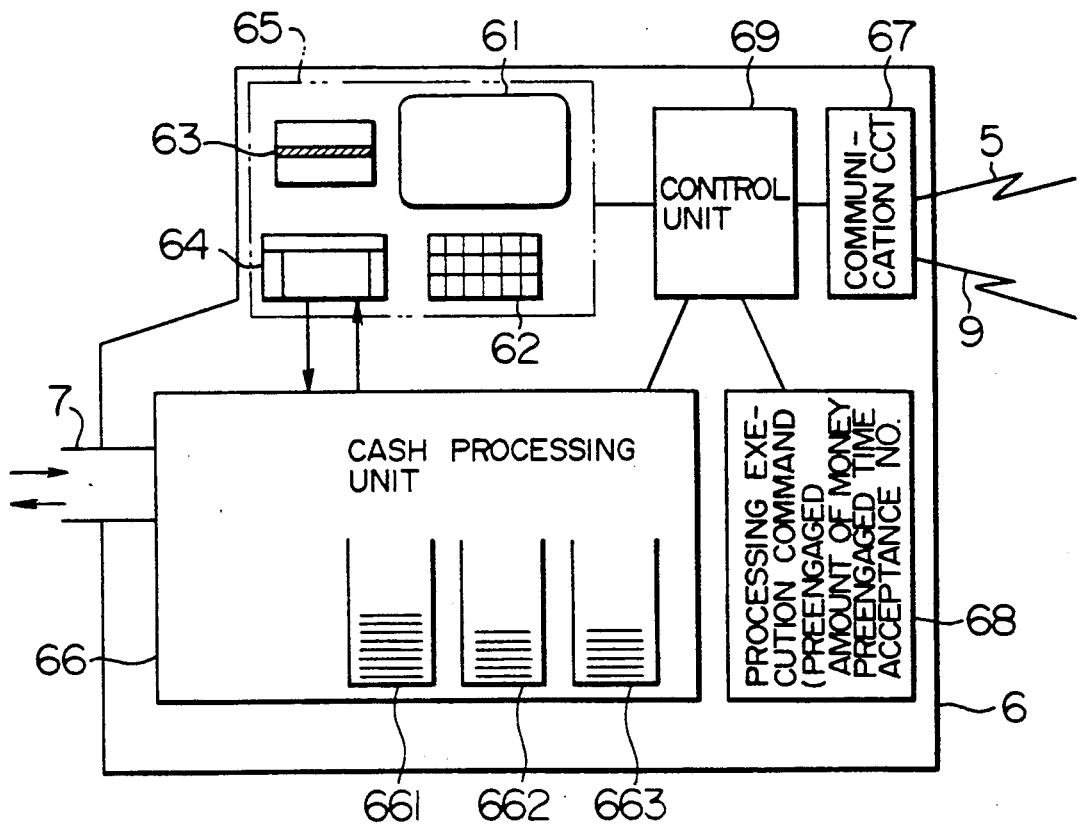
FIG. 3 is a block diagram of an automatic cash dealing apparatus shown in FIG. 1.

As shown in FIG. 3, the cash processing apparatus 6 (6a or 6b) includes a display unit 61 displaying an operational procedure, a message and data to be input by the customer, a keyboard 62 inputting necessary data by the customer in accordance with the operational procedure, an operation portion 65 consisting of a card input and output portion 63 reading data recorded on an identification card which records a customer's identification data such as an account number, and a cash receipt and payment portion 64 receiving and paying cash in response to the transactions, a cashing portion 66 provided with cash storages 661, 662 and 663 storing cash to be received and payed, and processing the receipt and payment of the cash and conveying the cash, a communication line 67 exchanging data with the central control unit 3, a memory unit 68 storing data, and a control unit 69 controlling the operations of the above components.

Figure 4:
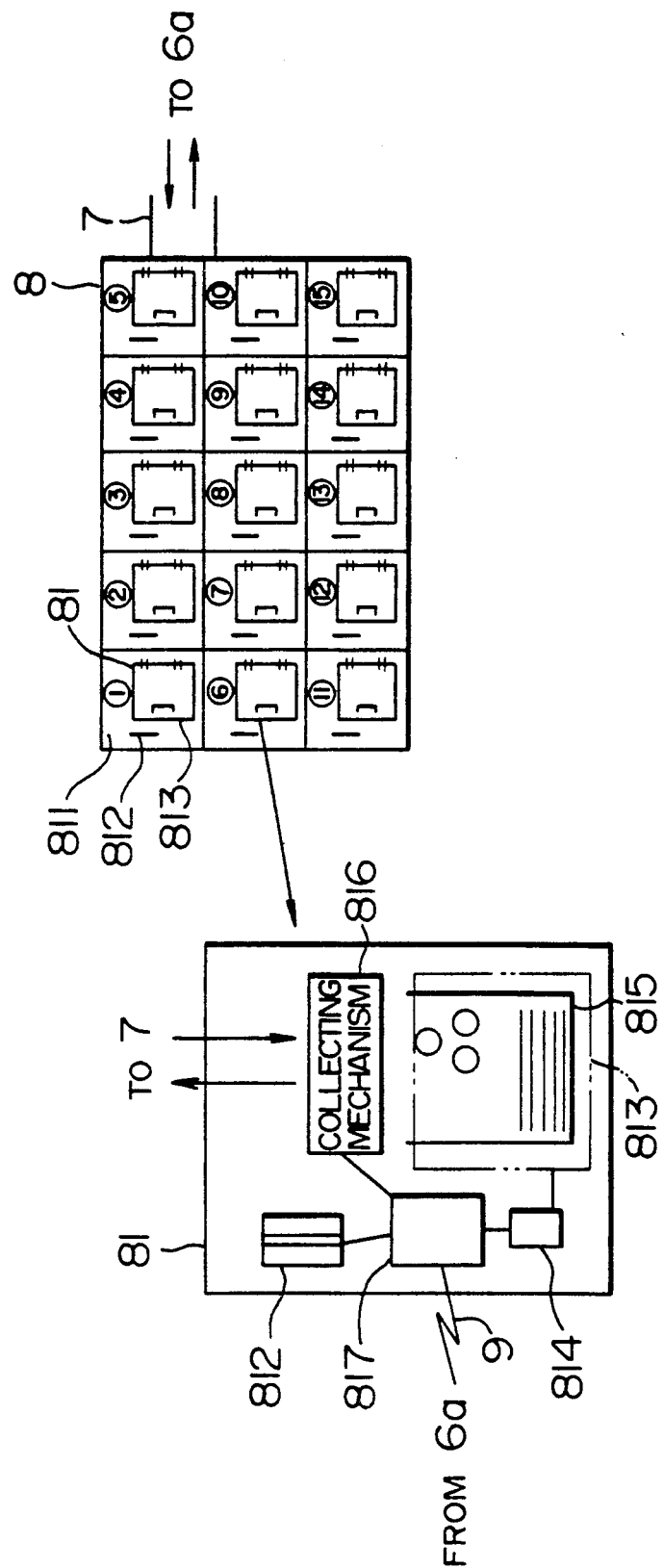
FIG. 4 is a view of a payment-money storage portion shown in FIG. 1 and connected to the automatic cash dealing apparatus.

As shown in FIG. 4, each of the money storages 81 in the payment-money storage 8 connected to the cash processing apparatus 6a is given a proper number and includes a card reader 812, a door 813, an electromagnetic lock 814 opening or closing the door 813, a cash container 815 accommodating the cash sent from the cash processing apparatus 6a through the cash conveying portion 7, a cash collecting mechanism 816 inputting the cash into the cash container 815 or collecting the cash from the cash container 815, and an operation control unit 817 controlling the operations of the above components. The operation control unit 817 is connected to the cash processing apparatus 6a through the communication line 71, to thereby cooperate with the cash processing apparatus 6a.

Figure 5:
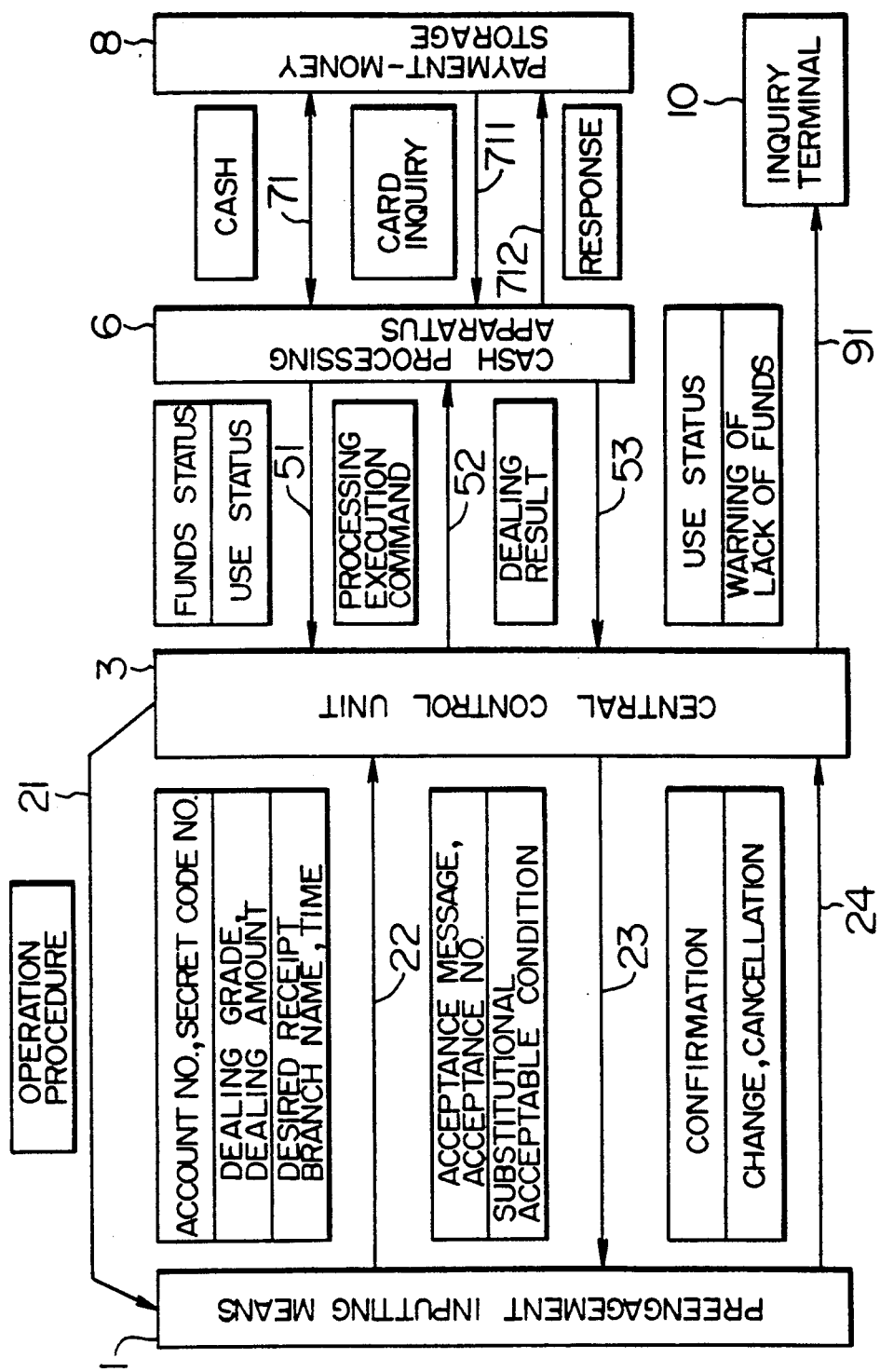
FIG. 5 is a view showing the data flow among a preengagement input means, the central control unit and the automatic cash dealing apparatus, which form a part of the system for preengaging a receipt and payment of money in accordance with the present invention.

As shown in FIG. 5, each component of the system for preengaging a receipt and payment of money carries out the data exchange in conjunction with other components to process the preengaged transactions input from the preengagement inputting means 1 by the customer. Namely, between the preengagement inputting means 1 consisting of the preengagement input terminal 1a and the telephone 1b the central control unit 3 sequentially transmits the operational procedure 21 to the preengagement inputting means 1 to display it on the display unit 11 and/or to announce it through the receiver 14, to thereby provide an operational procedure 21 to the customer. In accordance with the operational procedure 21, the customer designates preengagement data 22 such as an account number, a secret identification number, a grade of the transactions, an amount of money to be transacted, a bank branch name (or a code) at which the customer desires the reception of money, and a time at which the customer desires the reception of money to the central control unit 3 through the card reader 12, the keyboard 13 or the pushbottom portion 15 in the preengagement inputting means 1. The central control unit 3 determines whether or not the received preengagement data is acceptable, and provides a message and an acceptance number to the customer when the preengagement data is acceptable. Alternatively, the central control unit 3 will provide a message consisting of a substitutional acceptable condition, an acceptable time, a substitutional acceptable bank branch name to be transacted or a limit of money to be payed when the preengagement data is not acceptable. The customer carries out an inputting processing 24 for varifying, changing or cancelling the preengagement data 22.

Between the cash processing apparatus 6 (6a or 6b) in each branch and the central control unit 3, the funds and use condition 51 of the cash processing apparatus 6 which is used for determining whether or not the preengagement is acceptable is sent from the cash processing apparatus 6 to the central control unit 3. The central control unit 3 transmits a processing execution command 52 consisting of the grade of the dealing, the amount of dealing money, the dealing expectation time, the account number, and the secret identification number to the corresponding cash processing apparatus 6 from which the preengagement data is sent, and thereafter, the central control unit 3 sequentially receives data comprising the condition indicating whether or not such dealing is established from the cash processing apparatus 6. After terminating the operation of the central control unit 3, this operation is carried out when the central control unit 3 is restarted.

Between the cash processing apparatus 6 and the payment-money storage 8, information is exchanged regarding a cash sending and collection 71 corresponding to the payment preengagement transactions, an inquiry 711 of the identication data of the identification card inserted into the card reader 82 by the customer when receiving the money, and a response 712 thereof. The central control unit 3 transmits information 91 indicating a status of the cash processing apparatus 6a or 6b in the teller's window 4a or 4b, or an alarm indicating a lack of the funds, to the inquiry terminal 10a or 10b.

The main operation of the system for preengaging a receipt and payment of money will be described with reference to flowcharts.

Figure 6:
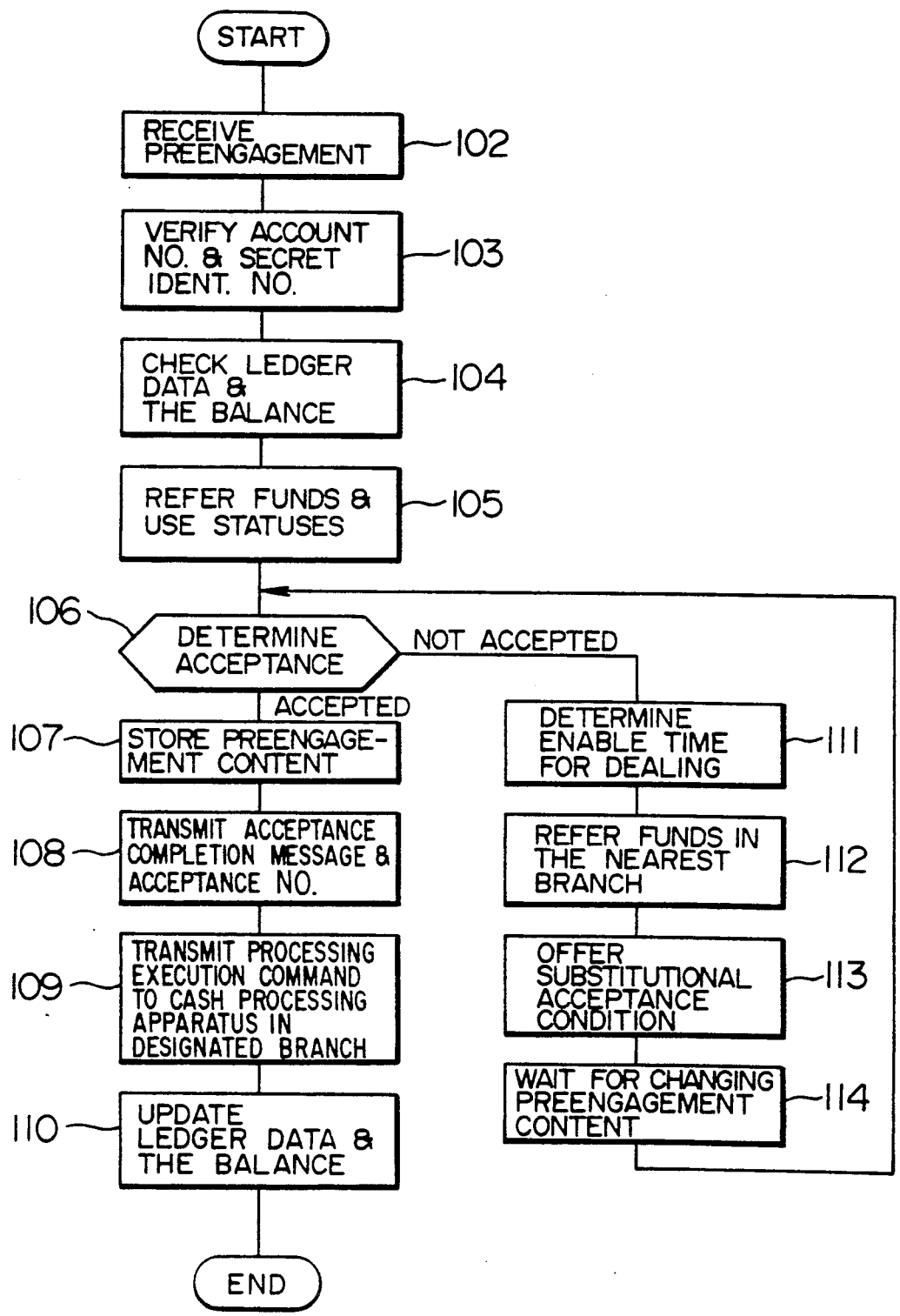
FIG. 6 is a flowchart showing an operational sequence of a preengagement of the central control unit when the central control unit receives the preengagement data by a customer.

First, the operation of the central control unit 3 for determining an acceptance of the preengagement content requested by the customer will be described with reference to FIG. 6.

The central control unit 3 carries out step 102 for determining whether or not the preengagement data 22 input by the customer through the preengagement inputting means 1 is acceptable, and steps 103 and 104 for verifying the account number and the secret identification number of the customer, and for checking the balance of the ledger with reference to the data stored in the memory unit 33a. When the customer is acceptable, the determination of the validity of the preengagement data 22 is carried out by the arithmetic unit 32 as the transactions, with reference to the funds and the use of the branch to which the customer designates the transactions, which are stored in the memory units 33b and 33c. In addition, already accepted transactions are also referred for this determination. When the preengagement content is determined to be valid, the central control unit 3 stores the preengagement content to the memory unit 33c (step 107), reserves the funds needed for the transactions, and transmits a preengagement completion message or an acceptance number to the display unit 11 and/or the receiver 14 (step 108), to thereby inform the customer. Subsequently, the central control unit 3 transmits the received preengagement data 22 to the cash processing apparatus 6 installed in the designated branch as the processing execution command 52 (step 109). When the cash processing apparatus 6 receives the preengagement data 22, the central control unit 3 deems that the dealing is completed, and the arithmetic unit 32 calculates the balance and updates the balance in the ledger (step 110), to thereafter terminate the operation.

When the money reception is determined to be invalid at step 106, the arithmetic unit 32 determines a time range available for the dealing in the designated branch and a limit of money for the dealing (step 111), determines whether or not substitutional transactions can be adopted with reference to the funds and the use of the nearest branch stored in the memory units 33b and 33c (step 112), sends the resulting substitutional acceptance condition to the display unit 11 or the receiver 14 in the preengagement inputting means 1 when the substitutional condition is obtained, to provide this information to the customer (step 113), and waits for a change or a cancellation of the preengagement data by the customer (step 114). When the arithmetic unit 32 receives any of the responses indicated at step 114, the arithmetic unit 32 repeats the operations from the operation of step 106.

Here, more specific operations for determining the acceptance of the preengagement, carried out by the central control unit 3, will be described.

First, the acceptability of the funds will be described. Assuming that the funds of the cash processing apparatus 6 in the branch designated by the customer and included in the preengagement data 22 is expressed by M, the preengaged payment (not yet an actually transacted amount of money) which is already accepted at the branch in question is expressed by A, and an amount of receipt of money for which the transactions will be completed by the time requested for dealing of the customer is B, the funds P available for paying to the preengagement request is expressed by the following formula;

$$P = M - k_1 A + k_2 B \qquad \text{(c-1)}$$

Coefficients $k_1$ and $k_2$ indicate correction coefficients obtained by statistical data processing for the number of past transactions, and receipt and payment of money which are accumulated as the past use 51, and are preset for each branch, each week, every day and for each time range to be compatible with an actual status fo each monetary facilities.

In addition, if the funds providing for non-preengagement during the transactions time range of the branch can be predicted, and assuming that the amount of the funds is expressed by D, the acceptable funds P' can be expressed by the following formula, instead of the above formula (c-1).

$$P' = M - k_1 A + k_2 B - D \qquad \text{(c-2)}$$

Assuming that an amount of the payment requested by the customer is n, when either of the following formulas is satisfied, the payment is acceptable.

$$n \leq P \text{ or } n \leq P' \qquad \text{(c-3)}$$

Similarly, assuming that the receipt of money is expressed by m, when the amount of money $m+P$ or $m+P'$ is smaller than a storage capacity of money in the cash processing apparatus 6, the receipt of money can be accepted.

Second, the availability of funds based on time will be described. When the operation time for the dealing which is defined by the accepted preengagements and the number of the non-preengagements, when non-preengagement can be predicted by a statistical method similar to the above mentioned method, does not exceed an ability of the cash processing apparatus 6 in the branch, the preengagement can be accepted.

If the preengagement is not accepted, the substitutional condition can be considered on the basis of the following preset change conditions;

(a) a change of time range, (b) a change of an amount of money to be transacted, or (c) a change of the branch to the nearest branch.

When the substitutional condition can be obtained, the central control unit 3 transmits the resultant acceptable condition to the preengagement inputting means 1 as the response message 23.

The determination algorithm is described as an example, and therefore, the present invention is not limited to the above mentioned determination algorithm. For example, a statistical processing for proper monetary facilities, other judging formulas different from the above mentioned formulas, and other substitutional conditions can be adopted.

Figure 7:
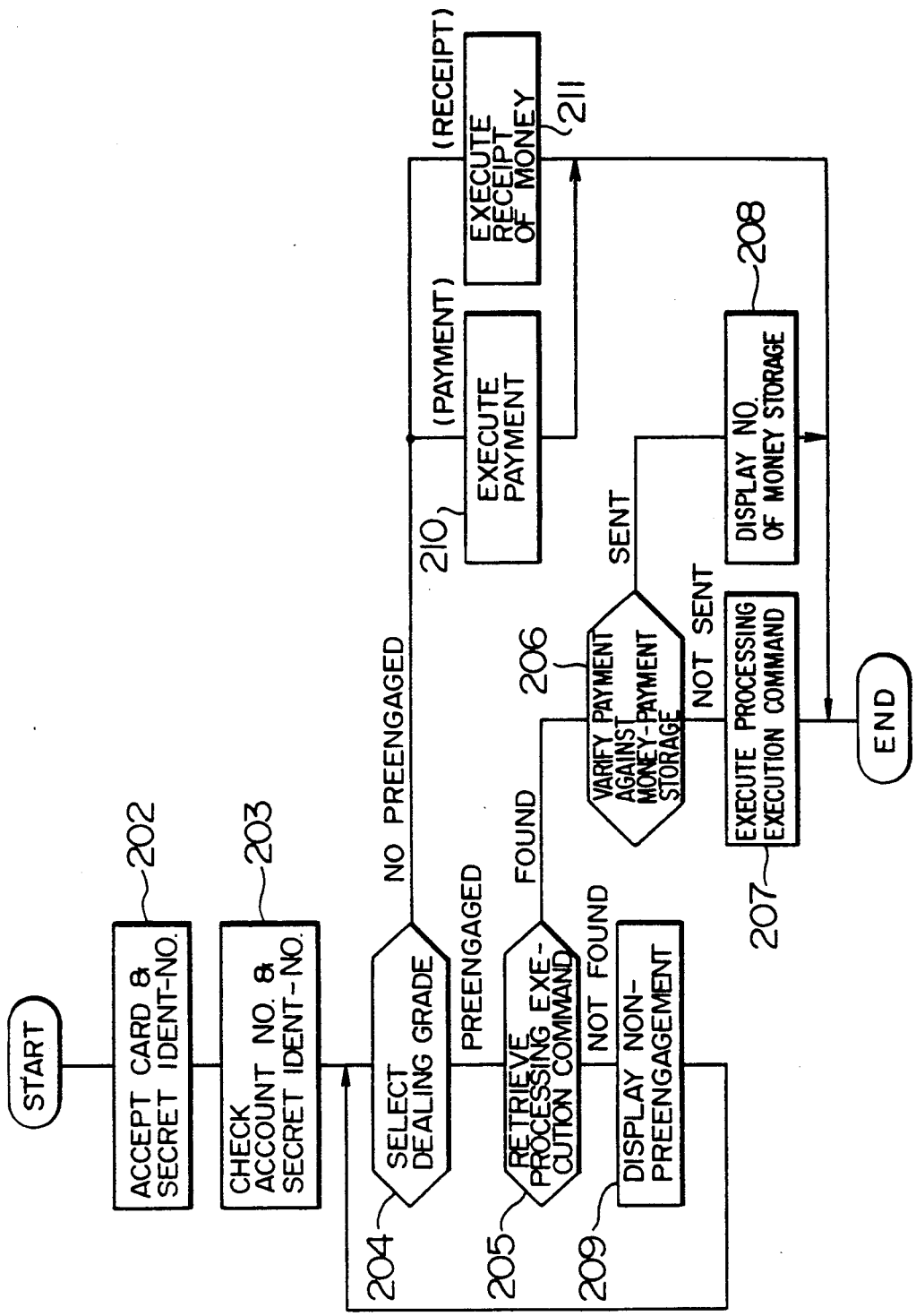
FIG. 7 is a flowchart showing a payment sequence when the preengagement requested by the customer is accepted by the central control unit.

The payment processing of the preengagement accepted through the above procedure will be described in detail with reference to FIG. 7.

A control unit 69 in the cash processing apparatus 6 stores the processing execution command 52 previously sent from the central control unit 3 to a memory 68, until the customer requests the transactions in response to the processing execution command 52. Also, if the payment-money storage 8 is connected to the cash processing apparatus 6 as shown in the teller's window 4a of FIG. 1, the control unit 69 stores the designated cash in cash containers 661, 662 and 663 of a cashing unit 66a in the cash processing apparatus 6 to empty money storages 81 of the money-payment storage 8, before the desired dealing time included in the processing execution command 52 corresponding to the payment preengagement request.

When receiving the preengaged money, the customer inserts the identification card into a card insertion and extraction portion 63a and inputs a secret identification number in accordance with the operational procedure displayed on a display unit 61a of the cash processing apparatus 6 installed in the designated branch. The cash processing apparatus 6 receives the customer's identification number from a keyboard 62a (step 202), checks the account number and the secret identification number when the customer's identification number is valid (step 203), and displays information indicating whether or not the dealing is preengaged, and determines whether or not the dealing is preengaged by inputting a status of a corresponding key (a preengagement key) on the keyboard 62a pushed by the customer (step 204). When the customer selects a mode of the preengagement, the cash processing apparatus 6 searches the processing execution commands 52 in the memory unit 68a to find the command corresponding to the customer (step 205), and determines whether or not money is delivered to the payment-money storage 8 when the corresponding command 52 is found (step 206). When money is not yet delivered to the storage 8, the cash processing apparatus 6 carries out the payment operation in accordance with the processing execution command, to send money from the cashing unit 66a to a cash receipt and payment hole 64a by a predetermined amount of money (step 207). Alternatively, when money is already sent to the payment-money storage 8, the cash processing apparatus 6 displays a proper number 811 indicating the money storage 81 in which the cash is stored through the display unit 61a, to indicate the receipt of money to the customer (step 208). When the customer inserts the card into the card reader 812 of the designated money storage 81, a control unit 817 of the money storage 81 communicates with the cash processing apparatus 6 through the communication line 71, to determine whether or not the data recorded on the card is correct. When the data on the card is correct, the control unit 817 deenergizes the electromagnetic lock 814 to open the door 815. Accordingly, the customer can receive money. Then, the dealing is completed and the corresponding processing execution command 52 is deleted.

Alternatively, if the corresponding processing execution command is not found through the retreival at step 205, a message "no preengagement" is displayed on the display unit 61a, and an operation for a non-preengagement is output to the customer (step 209).

When the non-preengagement type dealing is selected at the determination of step 204, the cash processing apparatus 6 carries out the payment or deposit of money in response to the transactions data input from the keyboard 62a by the customer in accordance with the operational procedure displayed on the display unit 61a (steps 210 and 211).

Figure 8:
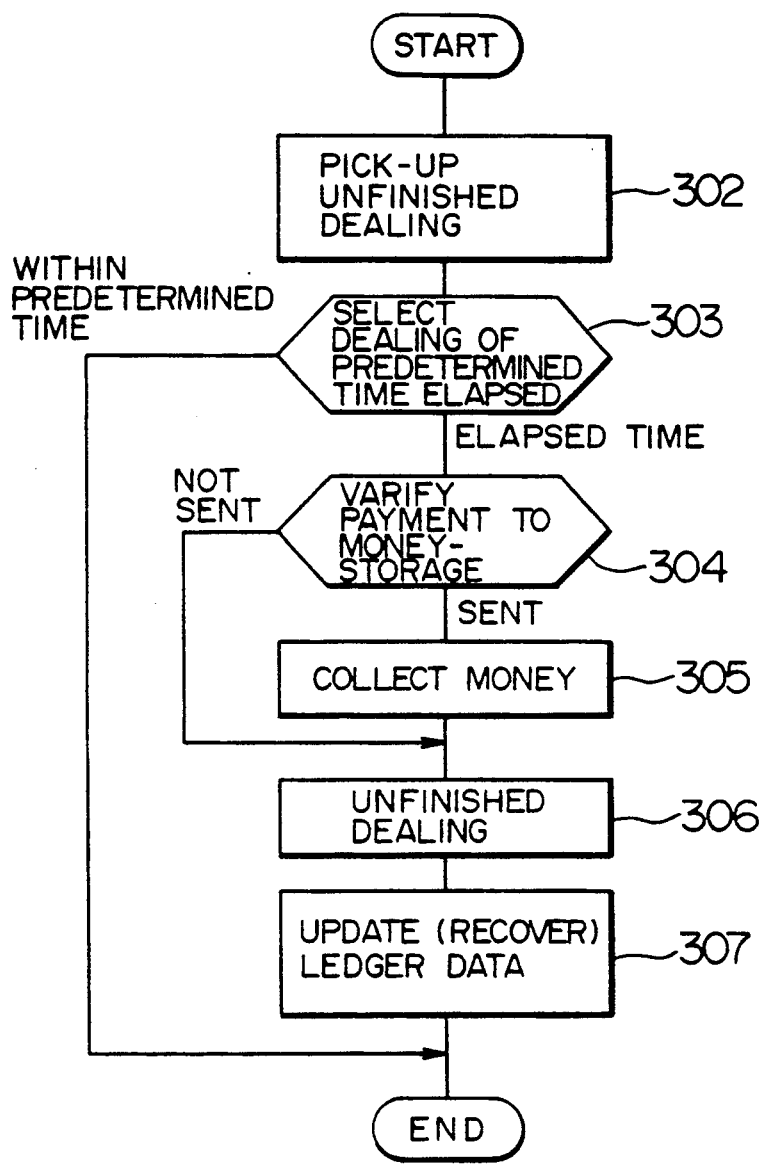
FIG. 8 is a flowchart showing an automatic cancellation of transactions when the preengaged dealing is not completed within a predetermined period of time.

The automatic cancellation of the preengaged dealing when the dealing is not established for a long time will be described with reference to FIG. 8.

The control unit 69 of the cash processing apparatus 6 periodically checks the processing execution commands stored in the memory unit 68, and picks up the dealings which are not yet completed after the elapse of the dealing time required by the customer and after the elapse of a further predetermined time T (steps 302 and 303). If money for the unfinished dealing is already sent to the payment storage 8, the control unit 69 carries out the money collection from the money storage 81 of the payment-money storage 8 (steps 304 and 305), assigns the money storage 81 for other payments, sends the result of the unfinished dealing to the central control unit 3 (step 306), and then, deletes the processing execution command. If the central control unit 3 is not operated at that time, the transmission of the unfinished dealing is carried out after the central control unit 3 is restarted. The central control unit 3 updates the balance in the ledger such that the dealing reverse to the requested dealing is achieved, and stores the result in the memory unit 33a.

In the above procedure, if the setting time T is divided into an overtime $T_1$ for determining collecting the money from the payment-money storage 8, and another overtime $T_2$ for determining the unfinished dealing, and the time $T_1$ is shorter than the time $T_2$, the use of the payment-money storage 8 can be improved and the dealing for the customer who will operate the cash processing apparatus after the requested time can be achieved.

According to the above embodiment of the present invention, the following effects can be obtained;

(1) The funds necessary for dealing in the branch can be easily predicted by preengaging of the transactions.

(2) When the preengagement is not accepted, the acceptable substitutional condition can be provided for the customer to enable the change of the dealing by the customer.

(3) Since the cash processing apparatus in the branch and the central control unit are connected by the communication line, concentration management at the center can be achieved.

(4) Since the transmission of the processing execution command initiates the update of the ledger, with respect to the preengagement business, the operation by the central control unit and the business in the branch through the cash processing apparatus can be separated from each other every time, and thus, the cash processing apparatus can be used after the elapse of a normal service time, when the preengagement is registered.

(5) The operation of the customer at the teller's window can be simplified by the preengagement, the operation time of the cash processing apparatus can be shortened, and thus the waiting time can be shortened. Also, if a user is concerned about lacking skill or experience in using the cash processing apparatus, the preengagement operation can be easily carried out by another person asked to handle the dealing and having a skill for handling the cash processing apparatus, such as a friend.

(6) Since the preengagement through the telephone and the operation of the cash processing apparatus are simplified, inexperienced persons can easily use the cash processing apparatus without misoperation.

Although, a single cash processing apparatus is installed in each teller's window in the above embodiment as an example, a plurality of the cash processing apparatuses can also be installed in each teller's window, and in this case, the following constructions are preferable.

Figure 9:
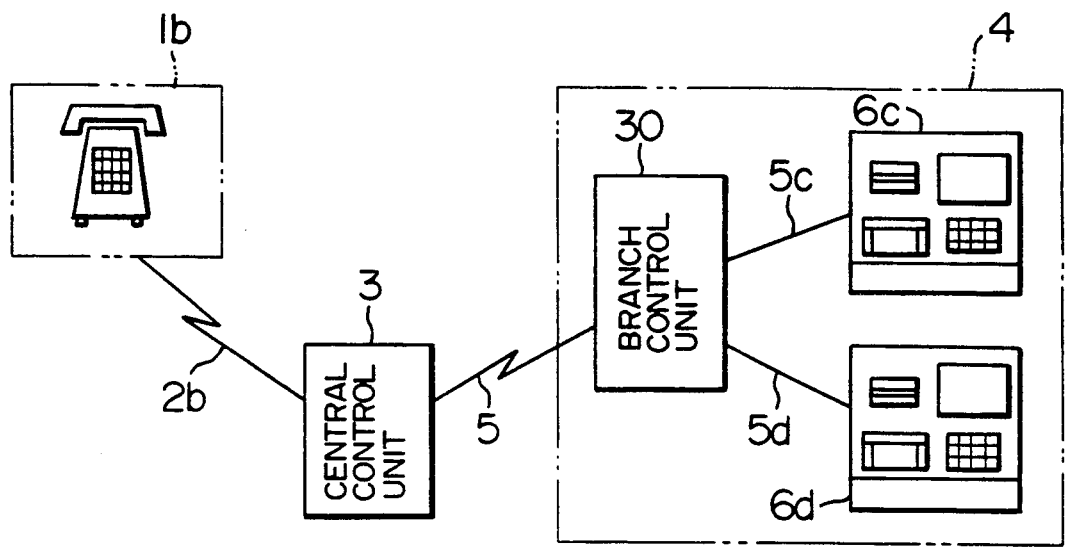
FIGS. 9 and 10 are views illustrating constructions of second and third embodiments of a system for preengaging a receipt and payment of money in accordance with the present invention.

The construction shown in FIG. 9 is a modified form of FIG. 1 which includes a plurality of cash processing apparatuses 6c and 6d installed in the teller's window 4 of the branch, and a branch control unit 30 provided among the central control unit 3 and the cash processing apparatuses 6c and 6d to communicate therebetween through communication lines 5, and 5c 5d. Similarly, the construction shown in FIG. 10 differs from FIG. 1 in that a master cash processing apparatus 6A, and slave cash processing apparatuses 6c and 6d connected the master cash processing apparatus 6A by communication lines 5c and 5d are provided in the teller's window 4 of the branch.

Figure 10:
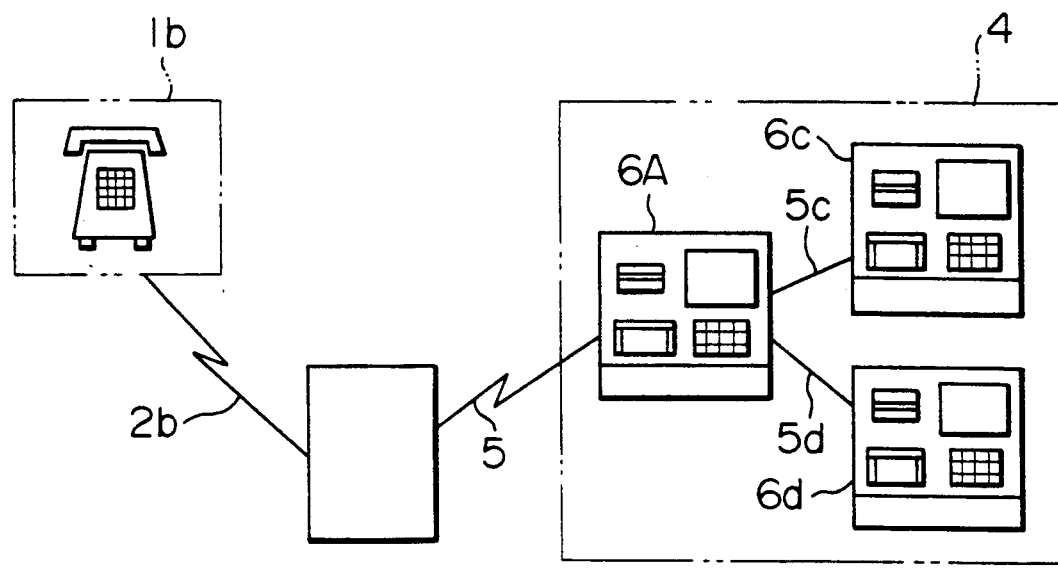

The operation of the embodiments shown in FIGS. 9 and 10 is similar to that in FIG. 1 set forth above except that the branch control unit 30 or the master cash processing apparatus 6A functions as a supervisory controller which gathers the data such as the funds or the use of the cash processing apparatuses 6c and 6d, transmits the same to the central control unit 3, receives the processing execution command from the central control unit 3, and selects one of the cash processing apparatuses 6A, 6c and 6d which will perform at the highest efficiency at that time.

The embodiments shown in FIGS. 9 and 10 can also result in effects similar to those obtained by the first embodiment.

The above embodiments are merely examples, and thus, the present invention is not limited to the embodiments, and many modifications can be adopted.

As seen from the above description, according to the present invention, the customer can make the preengagement of the dealing through the preengagement inputting means at a free time of the cash processing apparatuses, and accordingly, the operation time for inputting the dealing data is suitably distributed in a service time, the waiting time at the rush hour is shortened, and in particular, the waiting time due to the misoperation can be greatly shortened. In addition, users who are not familiar with the handling the cash processing apparatuses, such as the aged can achieve the preengagement operation by a friend having the exprience of the operation, at the free time.

The central control unit functions as a total supervisory controller for managing the preengagement data, and the funds and use of the cash processing apparatuses, to thereby previously calculate the funds necessary for the transactions, and to provide the acceptable substitutional preengagement condition to the customer when the cash processing apparatuses encounter the rush dealings such that the discontinuation of the handling by the cash processing apparatuses, due to the lack of the funds or many requests of the dealing, can be prevented, and therefore the efficiency of the use of the funds can be improved.

What is claimed is:

1. A method of preengaging a receipt and/or payment of money, carried out in a system for carrying out a receipt and/or payment of money installed in monetary facilities, the method comprising the steps of:

inputting dealing data from a user as preengagement data, to request carrying out a dealing for the receipt and/or payment of money at a cash processing apparatus at a branch of the system requested by the user;

determining acceptability of said input preengagement data with reference to use data regarding present and/or predicted funds in the cash processing apparatus installed at the requested branch;

transmitting said preengagement data to said requested branch to input said preengagement data thereto as a processing execution command when said preengagement data is determined to be acceptable to thereby permit the receipt and/or payment of money at the requested branch;

determining acceptability of substitutional preengagement data different from said preengagement data when said preengagement data is determined not to be acceptable for receipt and/or payment of money at the requested branch; and announcing said substitutional preengagement data to the user when said substitutional preengagement data is determined to be acceptable.

2. A method of preengaging a receipt and/or payment of money according to claim 1, further comprising the step of confirming, varying or cancelling said announced substitutional preengagement data by the user to thereby advise the system as to the user's intention regarding the announced substitutional preengagement data.

3. A method of preengaging a receipt and/or payment of money according to claim 1, wherein said step of determinating the acceptability of preengagement data is carried out with reference to other preengagement data which has already been determined to be acceptable for the requested branch.

4. A method of preengaging a receipt and/or payment of money according to claim 1,
wherein said step of determining acceptability of substitutional preengagement data is carried out with reference to data indicating the present and/or predicted funds in a cash processing apparatus in a branch different from said branch request by the user in the input preengagement data.

5. A method of preengaging a receipt and/or payment of money according to claim 1, wherein said dealing data comprises data regarding a time requested by the user for transacting receipt and/or payment of money the requested branch, and said substitutional preengagement data comprises data regarding a time different from the time requested by the user in said input preengagement data.

6. A method of preengaging a receipt and/or payment of money according to claim 1, wherein said dealing data comprises data regarding an amount of money requested by the user to be received and/or paid, and said substitutional preengagement data comprises data regarding an amount of money to be received and/or paid different from said the requested amount of money.

7. A method of preengaging a receipt and/or payment of money according to claim 4, wherein said substitutional preengagement data comprises data regarding a branch different from said requested branch.

8. A system of preengaging a receipt and/or payment of money in monetary facilities, the system comprising:
preengagement inputting means for inputting dealing data as preengagement data, to carry out a dealing for the receipt and/or payment of money at a cash processing means at a branch of the system requested by the user; and
central control means, connected to said preengagement inputting means and said cash processing means, for receiving said preengagement data from said preengagement inputting means and use data regarding present and/or predicted funds at said cash processing means, and for determining acceptability of said input preengagement data with reference to said use data to determine whether to permit receipt and/or payment of money at the requested branch in response to the user's request.

9. A system of preengaging a receipt and/or payment of money according to claim 8, wherein said central control means comprises means for producing substitutional preengagement data to be indicated to said user, different from said input preengagement data, when said input preengagement data is determined not be acceptable.

10. A system of preengaging a receipt and/or payment of money according to claim 8, wherein said central control means comprises means for producing a processing execution command to be transmitted to said cash processing means on the basis of said input preengagement data when said input preengagement data is accepted to permit receipt and/or payment of money at the requested branch.

11. A system of preengaging a receipt and/or payment of money according to claim 10, wherein said cash processing means comprises means for temporarily storing said produced processing execution command.

12. A system of preengaging a receipt and/or payment of money according to claim 8, wherein said cash processing means comprises selecting means for carrying out the selection of whether or not said dealing has been preengaged by the user.

13. A method of preengaging a receipt and/or payment of money, carried out in a system for carrying out a receipt and/or payment of money installed in monetary facilities, the method comprising the steps of:
inputting dealing data from a user as preengagement data, to request carrying out a dealing for the receipt and/or payment of money at a cash processing apparatus at a branch of the system requested by the user;
determining acceptability of said input preengagement data with reference to use data regarding present and/or predicted funds in the cash processing apparatus installed at the requested branch;
transmitting said preengagement data to said request branch to input said preengagement data thereto as a processing execution command when said preengagement data is determined to be acceptable to thereby permit the receipt and/or payment of money at the requested branch.

14. A method of preengaging a receipt and/or payment of money, carried out in a system for carrying out a receipt and/or payment of money installed in monetary facilities, the method comprising the steps of:
inputting dealing data from a user as preengagement data, to request carrying out a dealing for the receipt and/or payment of money at a cash processing apparatus at a branch of the system requested by the user;
determining acceptability of said input preengagement data with reference to use data regarding present and/or predicted funds in the cash processing apparatus installed at the requested branch;
transmitting said preengagement data to said requested branch to input said preengagement data thereto as a processing execution command when said preengagement data is determined to be acceptable to thereby permit the receipt and/or payment of money at the requested branch;

determining acceptability of substitutional preengagement data different from said preengagement data when said preengagement data is determined not to be acceptable for receipt and/or payment of money at the requested branch; and announcing said substitutional preengagement data to the user when said substitutional preengagement data is determined to be acceptable, wherein said step of determining the acceptability of said input preengagement data is carried out with reference to predicted funds in the requested branch at a time requested for use of the branch by the user, wherein said predicted funds are based on the number of other preengagement requests already made to reserve money at the branch.

15. A method according to claim 14, wherein said predicted funds are also based on a statistical estimate of transactions, other than preengaged requests, likely to take place at the requested branch between the time of the user's request and the time that the user has requested to use the branch.

16. A method according to claim 15, wherein said statistical estimate is based on past usage of the particular requested branch.

17. A system of preengaging a receipt and/or payment of money in monetary facilities, the system comprising:

preengagement inputting means for inputting dealing data as preengagement data, to carry out a dealing for the receipt and/or payment of money at a cash processing means at a branch of the system requested by the user; and central control means, connected to said preengagement inputting means and said cash processing means, for receiving said preengagement data from said preengagement inputting means and use data regarding present and/or predicted funds at said cash processing means, and for determining acceptability of said input preengagement data with reference to said use data to determine whether to permit receipt and/or payment of money at the requested branch in response to the user's request, wherein the control means determines the acceptability of said input preengagement data with respect to predicted funds in the requested branch at a time requested for using the branch by the user, wherein said predicted funds are based on the number of other preengagement requests already made to reserve money at the requested branch.

18. A system according to claim 17, wherein said predicted funds are also based on a statistical estimate of transactions, other than preengaged requests, likely to take place at the requested branch between the time of the user's request and the time that the user has requested to use the branch.

19. A system according to claim 18, wherein said statistical estimate is based on past usage of the particular requested branch.

20. A method of preengaging a receipt and/or payment of money, carried out in a system for carrying out a receipt and/or payment of money installed in monetary facilities, the method comprising the steps of:

inputting dealing data from a user as preengagement data, to request carrying out a dealing for the receipt and/or payment of money at a cash processing apparatus at a branch of the system requested by the user;

determining acceptability of said input preengagement data with reference to use data regarding present and/or predicted funds in the cash processing apparatus installed at the requested branch;

transmitting said preengagement data to said request branch to input said preengagement data thereto as a processing execution command when said preengagement data is determined to be acceptable to thereby permit the receipt and/or payment of money at the requested branch;

wherein said step of determining the acceptability of said input preengagement data is carried out with reference to predicted funds in the requested branch at a time requested for use of the branch by the user, wherein said predicted funds are based on the number of other preengagement requests already made to reserve money at the branch.

21. A method according to claim 20, wherein said predicted funds are also based on a statistical estimate of transactions, other than preengaged requests, likely to take place at the requested branch between the time of the user's request and the time that the user has requested to use the branch.

22. A method according to claim 21, wherein said statistical estimate is based on past usage of the particular requested branch.

* * * * *